Figure 1:
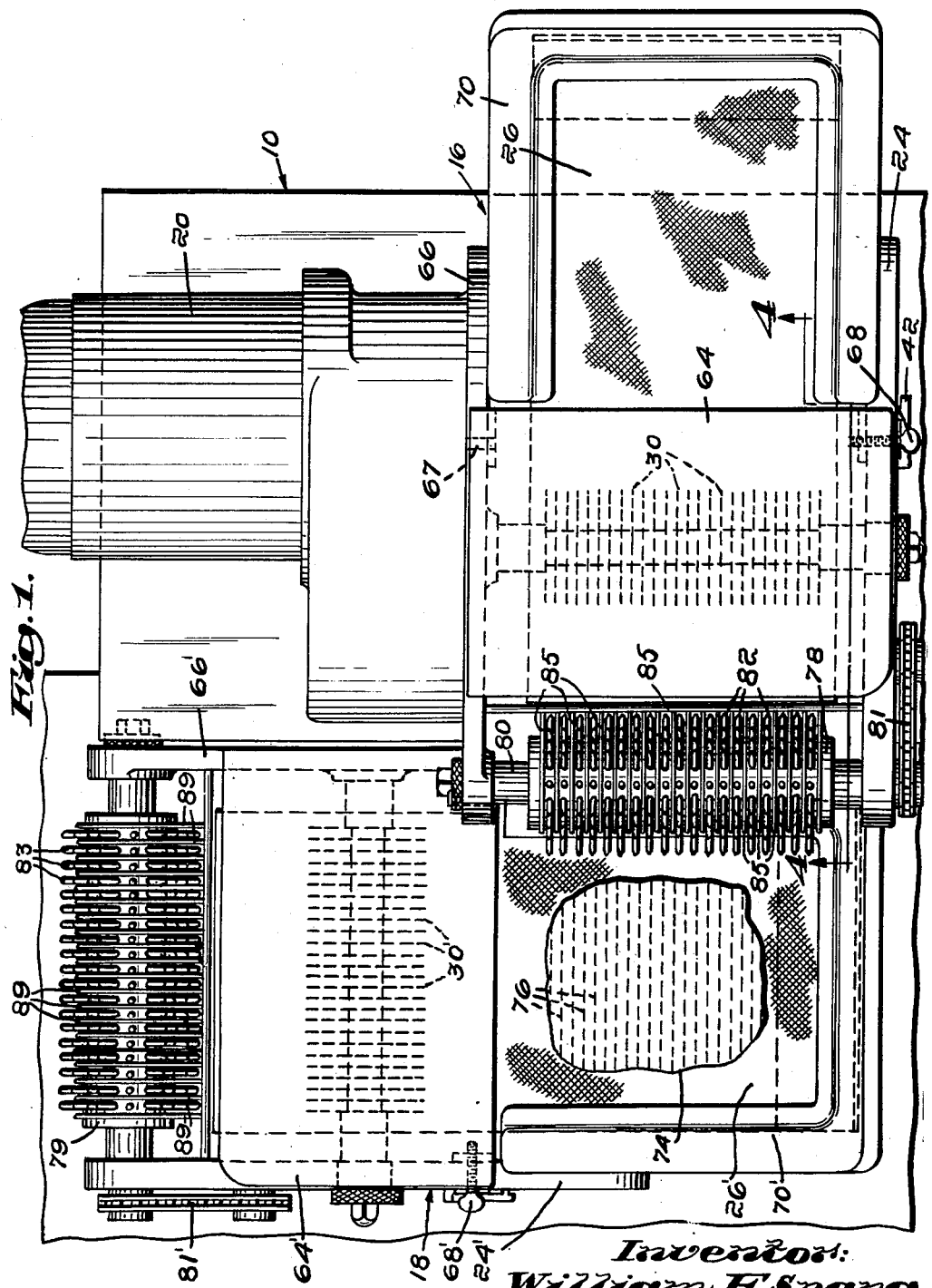

Aug. 14, 1951     W. F. SPANG     2,564,651

MEAT TENDERIZING MACHINE

Filed March 13, 1948     7 Sheets-Sheet 1

Aug. 14, 1951   W. F. SPANG   2,564,651
MEAT TENDERIZING MACHINE
Filed March 13, 1948   7 Sheets-Sheet 3

Inventor:
William F. Spang,
by Kenway, Jenney, Witter & Hildreth
Attorneys

Aug. 14, 1951     W. F. SPANG     2,564,651
MEAT TENDERIZING MACHINE

Filed March 13, 1948     7 Sheets-Sheet 5

Inventor:
William F. Spang,
by Kenway, Jenney, Witter & Hildreth
Attorneys

Aug. 14, 1951  W. F. SPANG  2,564,651
MEAT TENDERIZING MACHINE
Filed March 13, 1948  7 Sheets-Sheet 6

Inventor:
William F. Spang,
by Kenway, Jenney, Witter & Hildreth
Attorneys

Aug. 14, 1951  W. F. SPANG  2,564,651
MEAT TENDERIZING MACHINE
Filed March 13, 1948  7 Sheets-Sheet 7
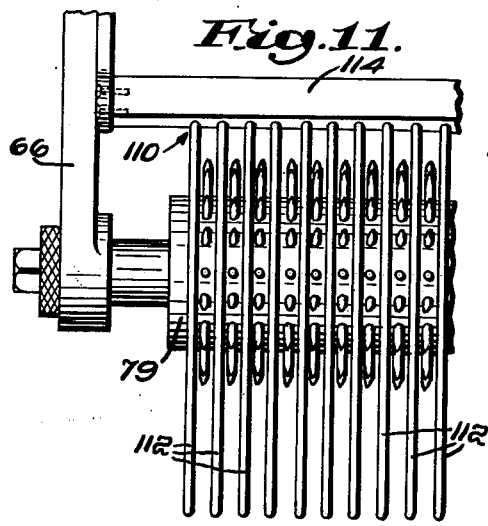
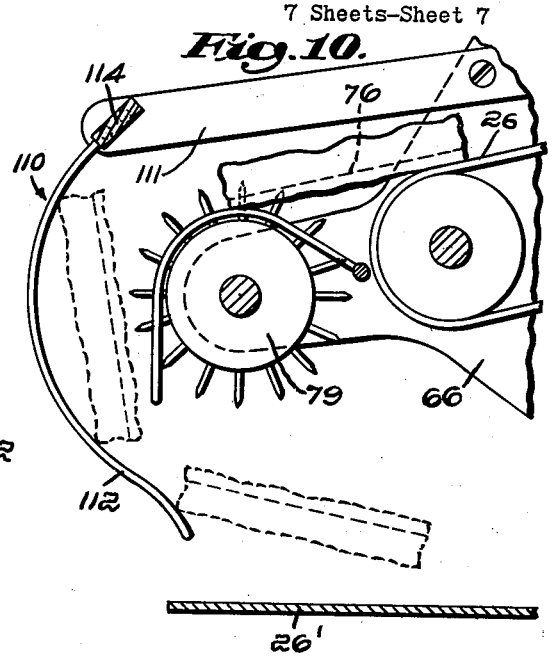
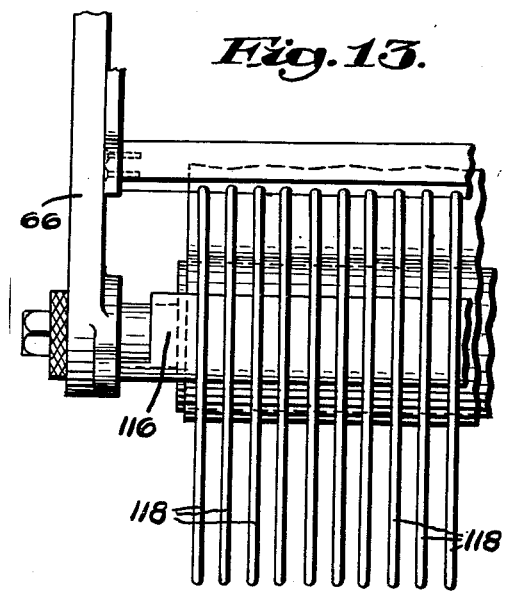
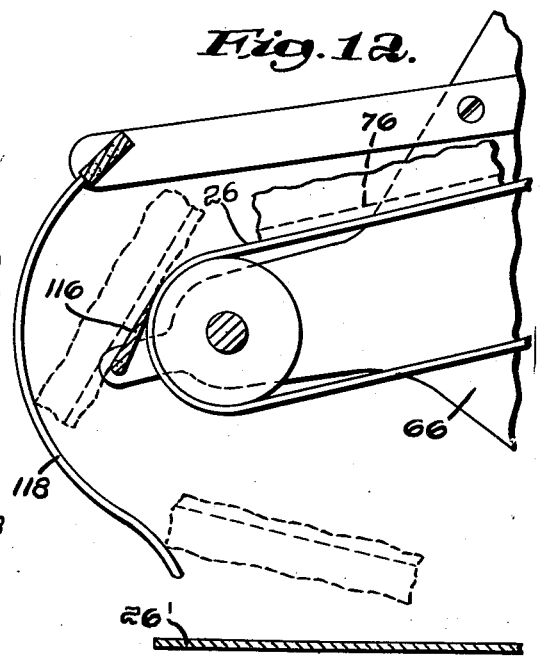
Inventor:
William F. Spang,
by Kenway, Jenney, Witter & Hildreth
Attorneys Patented Aug. 14, 1951

2,564,651

UNITED STATES PATENT OFFICE 2,564,651

MEAT TENDERIZING MACHINE

William F. Spang, Milton, Mass., assignor to Cube Steak Machine Co., Needham Heights, Mass., a partnership Application March 13, 1948, Serial No. 14,671

4 Claims. (Cl. 17—27)

This invention relates to machines for cutting and otherwise treating meat, particularly steaks, for severing, breaking and/or crushing the sinews to tenderize the meat. The invention contemplates the employment of an endless conveyor for conducting the meat along a predetermined path in which the meat can be tenderized along spaced parallel lines, and cooperating means disposed at the delivery end of the conveyor for stripping the meat from the conveyor and delivering it in predetermined manner for further treatment. In the preferred form of the invention meat on the conveyor is cut either continuously or discontinuously partially therethrough at one face as it passes along said path, is thereafter delivered by said cooperating means in upside-down position to a second conveyor which carries it through a second and relatively angular path wherein it is cut in a relatively angular direction at its opposite face. The means for stripping and delivering the meat from the first conveyor may be in the form of a stripping plate or fingers or a rotary toothed member disposed transversely of the conveyor at its delivery end and in position to engage the bottom face of the meat as it approaches the delivery end of the conveyor. A cooperating chute is also preferably provided to receive the meat and deliver it to the second conveyor. The production of a machine for performing these functions comprises the primary object of the invention.

The preferred means for stripping and delivering the meat from the first conveyor comprises a rotary toothed member disposed transversely of the conveyor at its delivery end and in position to engage the bottom face of the meat as it approaches the delivery end of the conveyor and carry it to or through a further predetermined treatment. In a further form of the invention this treatment includes a second rotary member arranged to cooperate with the first member and tenderize the meat as it passes between the members. One or both members may employ meat engaging and crushing teeth alternately arranged to engage the meat and break the sinews as it passes between the members, the meat thereafter being delivered to the second conveyor which conducts it to a further treating or packing station. The production of a machine embodying these features comprises a further object of the invention.

Figure 2:
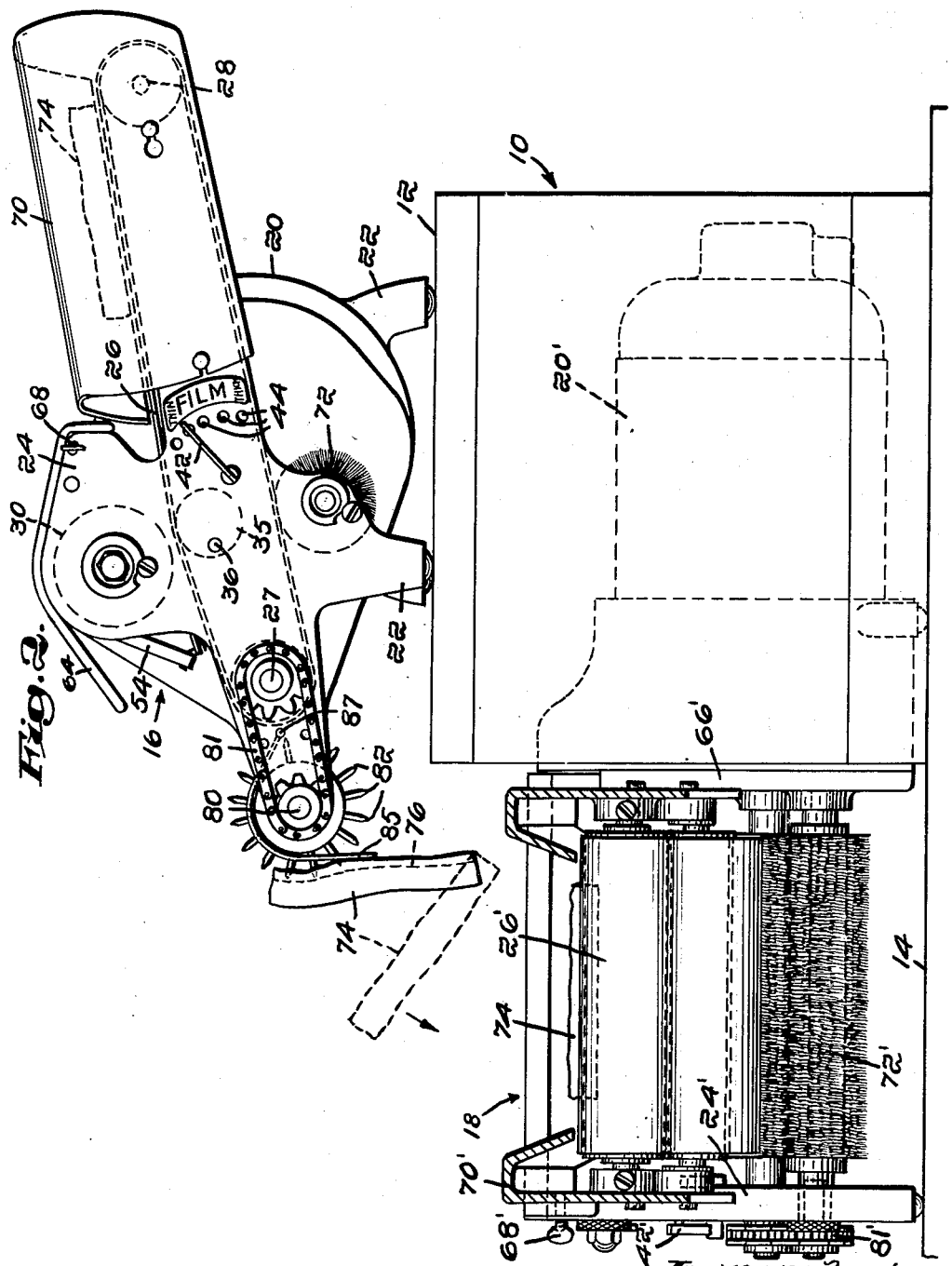
Figure 3:
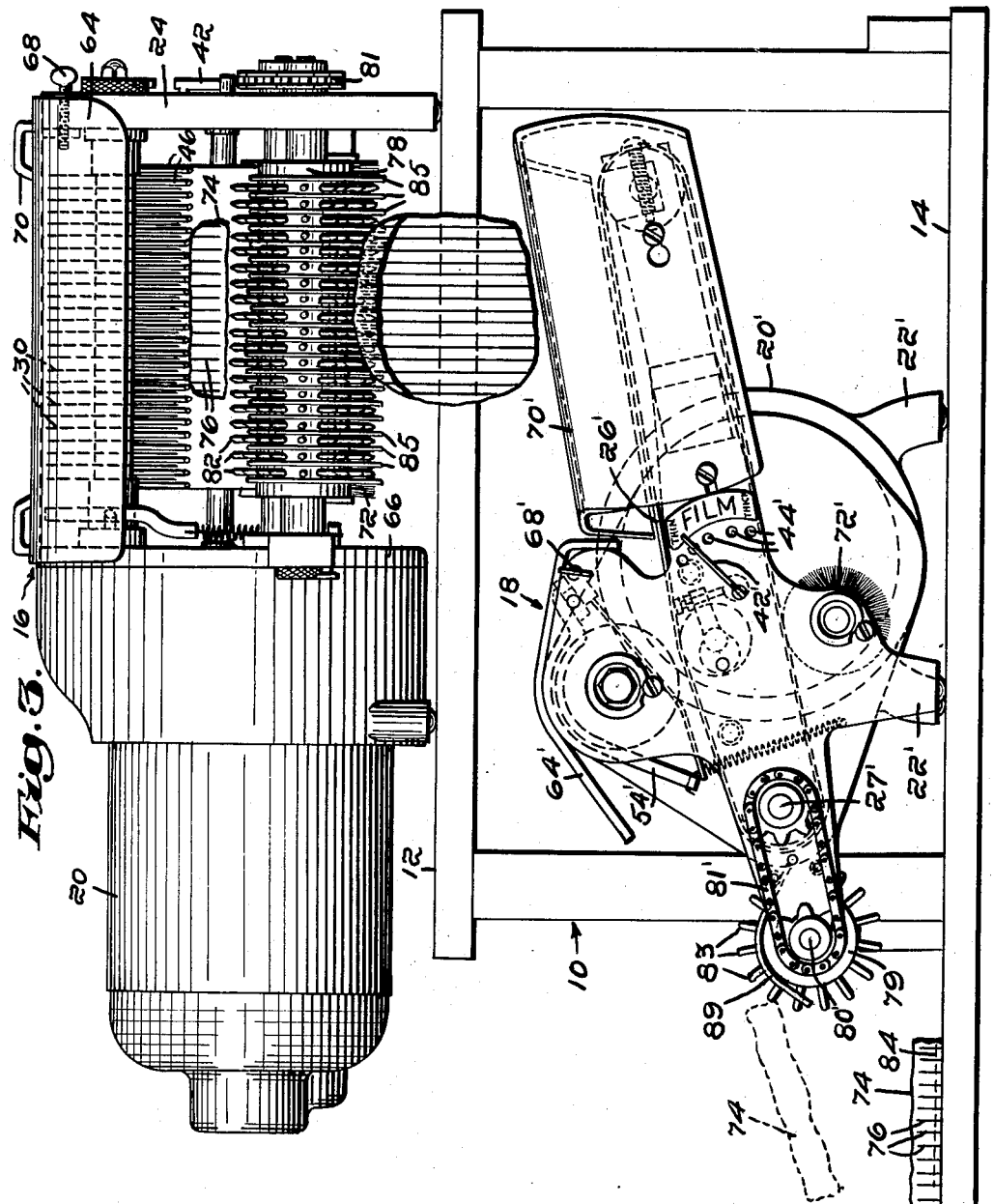
Figure 4:
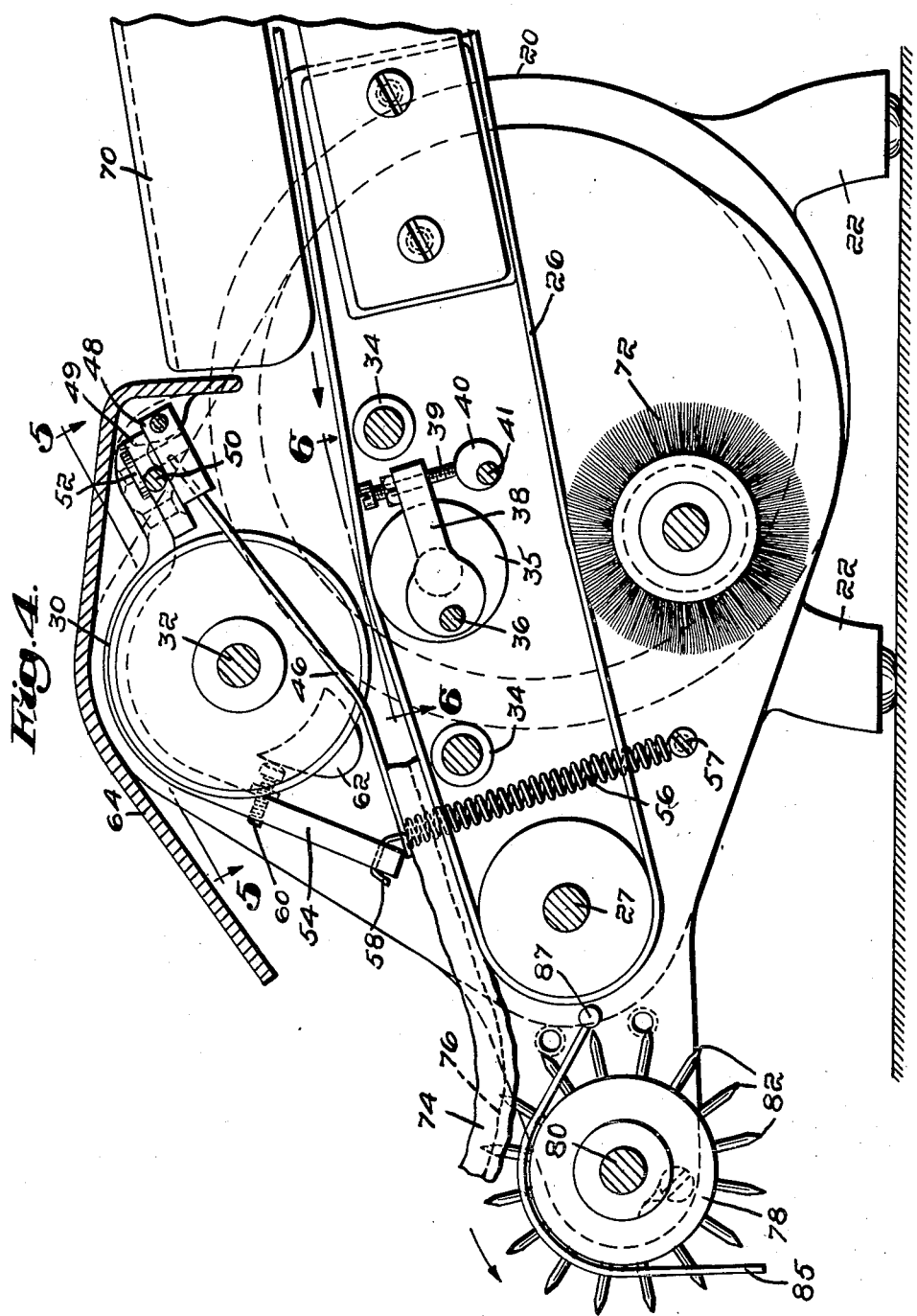
Figure 5:
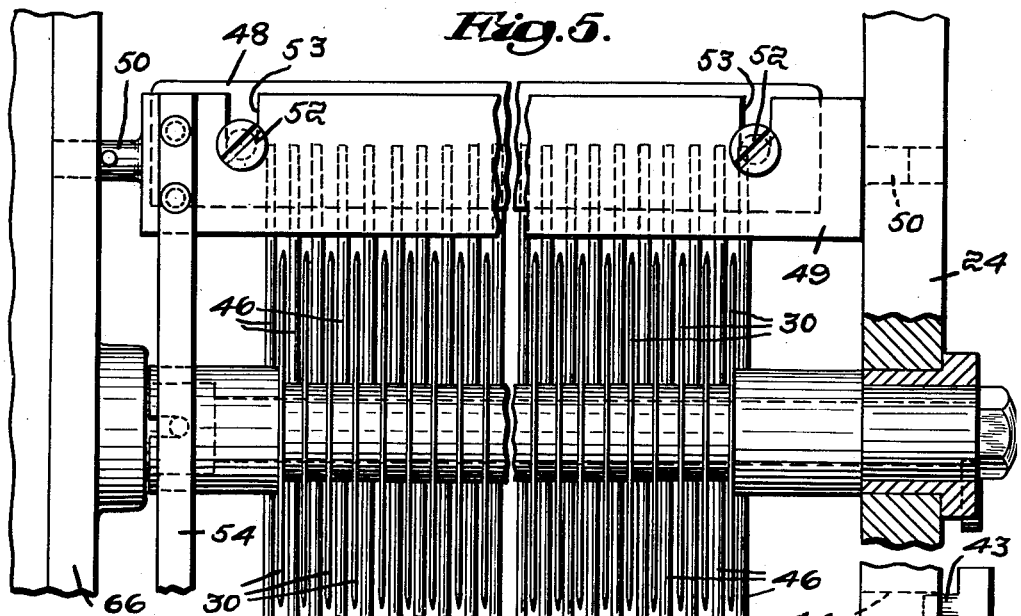
Figure 6:
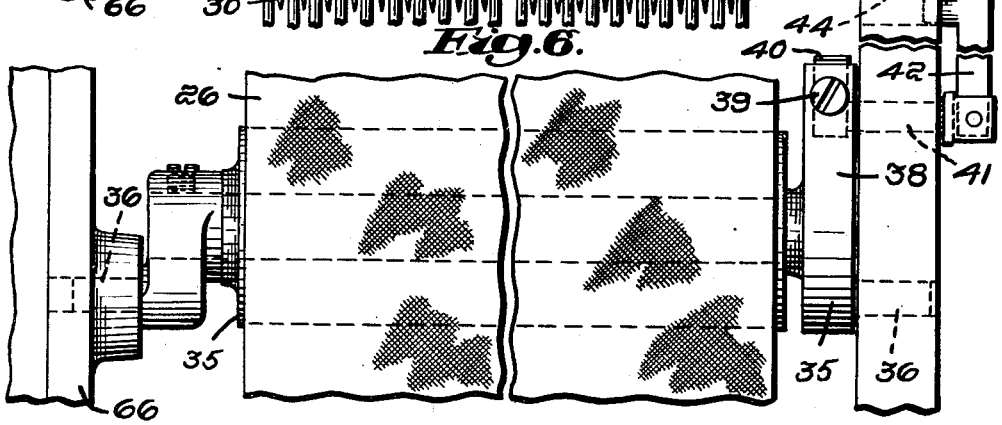
Figure 7:
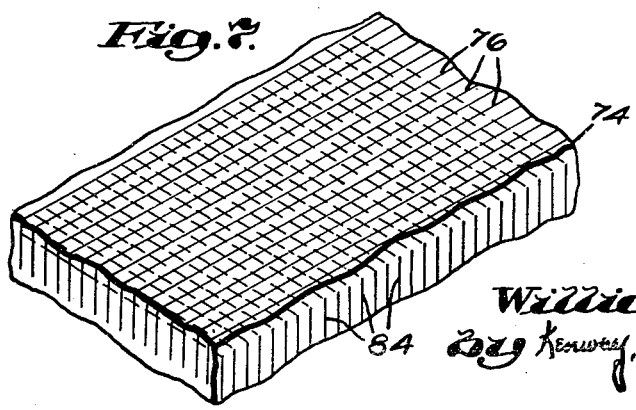
Figure 8:
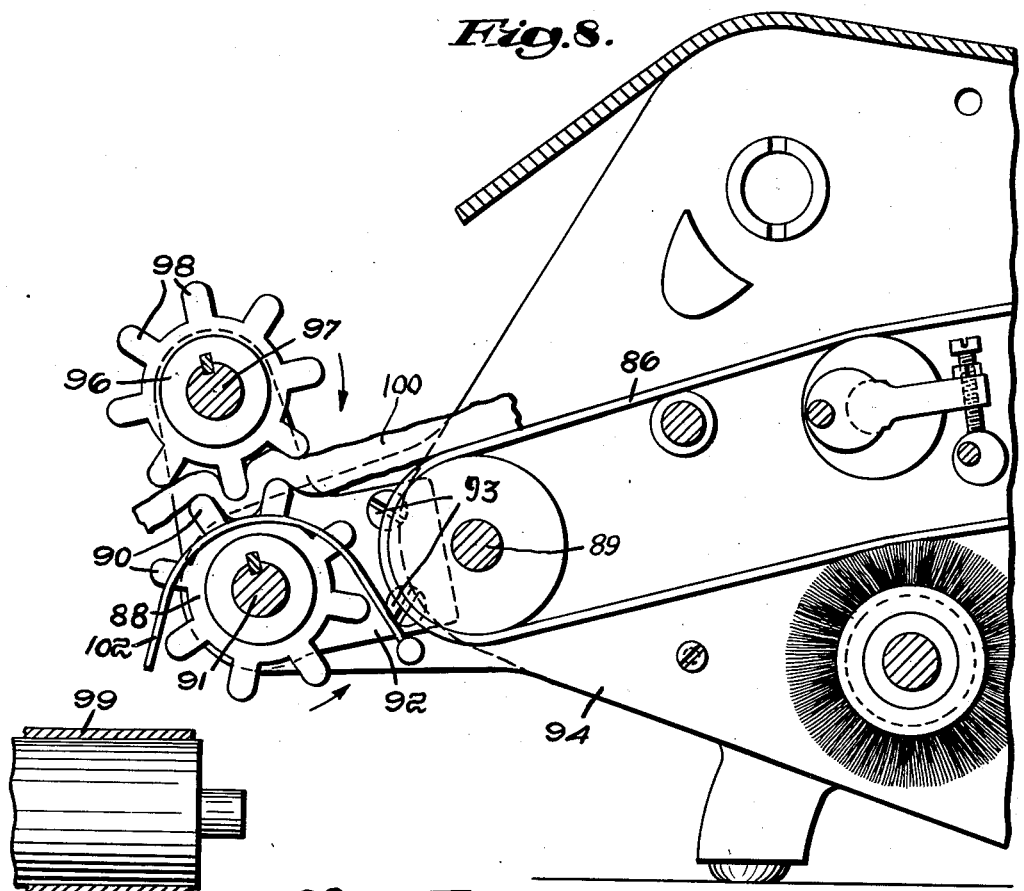
Figure 9:
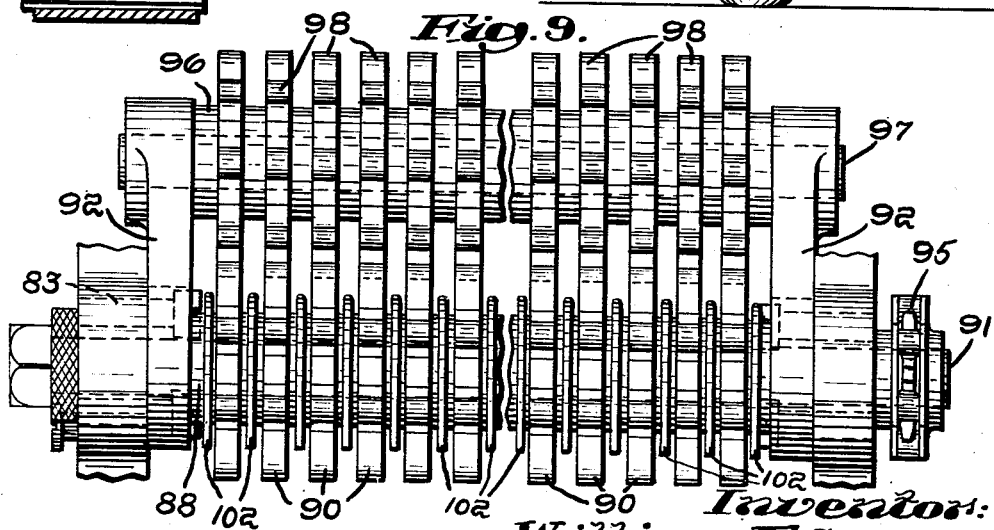

These and other features of the invention will be best understood and appreciated from the following description of preferred embodiments thereof selected for purposes of illustration and shown in the accompanying drawings, in which, Fig. 1 is a plan view of a preferred embodiment of my improved meat tenderizing machine, Fig. 2 is a side elevation thereof, Fig. 3 is a front elevation of the machine, Fig. 4 is an enlarged fragmentary sectional view taken on line 4—4 of Fig. 1, Fig. 5 is a further enlarged fragmentary view taken on line 5—5 of Fig. 4, Fig. 6 is a further enlarged fragmentary view taken on line 6—6 of Fig. 4, Fig. 7 is a perspective view of a steak treated by the machine, Fig. 8 is an enlarged side elevation of a modified construction, Fig. 9 is a front elevation of the meat treating rolls shown in Fig. 8, Fig. 10 is an enlarged fragmentary side elevation of a further modified construction, Fig. 11 is a fragmentary end elevation thereof, Fig. 12 is an enlarged fragmentary side elevation of another modified construction, and Fig. 13 is a fragmentary end elevation thereof.

Referring first to Figs. 1-4 of the drawings, 10 indicates a support having two machine supporting platforms 12 and 14, the platform 12 being located laterally of and above the platform 14. Two like meat treating machines 16 and 18 are supported on the two platforms and are adapted to conduct and treat pieces of meat first through the first machine at the higher elevation and from thence to and through the other machine, as and for the purpose hereinafter described. The same reference characters primed are used on machine 18 to designate parts corresponding to the machine 16.

The machine 16 embodies a motor 20 and meat treating mechanism driven thereby and supported on its platform by legs 22. The meat treating mechanism is carried by and between the motor and an end plate 24. An endless flat belt conveyor 26 slightly inclined downwardly toward its delivery end is carried on rolls supported by shafts 27 and 28. The top reach of the conveyor passes beneath a gang of rotary and relatively spaced knives 30 extending transversely thereacross, the knife supporting shaft 32 being suitably geared to and driven from the motor.

Two rolls 34 are provided beneath and for supporting the top reach of the conveyor at opposite sides of the gang of knives and a roll 35 mounted eccentrically on two trunnions 36 is provided beneath the reach and the knives. Rotary adjustment of the trunnions is adapted to raise or lower the reach relative to the knives and thus vary the thickness of cut in the meat carried by the conveyor. An arm 38 fixed to the trunnion 36 at the front end of the roll 35 has a downwardly extending adjusting screw 39 at its free end. The screw is in engagement with an eccentric 40 on a shaft 41 mounted in the plate 24. An arm 42 on the outer end of the shaft 41 has its free end provided with a detent 43 for engaging within holes 44 in the end plate 24. Adjusting of the arm to different holes is adapted to raise and lower the roll 35 as will be understood.

Meat engaging stripper fingers 46 are provided at opposite sides of and between the knives 30. The fingers are resilient elements mounted at one end in a block 48 carried by a member 49 pivoted at its ends 50 to the frame. The fingers extend obliquely downward from the block 48 and their free ends are substantially parallel with the conveyor as shown in Fig. 4. The block carries two threaded studs 52 slidably engaging within two slots 53 in the member 49 for supporting the block on the member. Tightening of the studs is adapted to hold the block secured to the member.

An arm 54 fixed to the member 49 extends transversely above and beyond the knife shaft 32. A tension spring 56 has one end anchored to the frame at 57 and its other end connected to the free end of the arm 54 at 58. The function of the spring is to rotate the member 49 in a direction moving the fingers into compressing contact with the meat on the conveyor. A screw 60 threaded into the arm and positioned to contact a stop 62 on the frame provides a stop limit to movement of the arm toward the conveyor under the action of the spring.

A protective cover or hood 64 is provided over the knives 30. The hood rests on the top portions of the plate 24 and the wall 66 adjacent to the motor and is secured in place by a stud 67 carried by the hood and engaging within holes in the wall 66 and a screw 68 extending through a bracket carried by the hood and threaded into the plate 24. The hood can be removed by removing the screw 68. A U-shaped protective guard 70 is provided about the entrance end margin of the top reach of the conveyor 26. The working face of the conveyor is also kept clean by a rotary brush 72 suitably driven by the motor 20 and arranged to engage the outer face of the bottom reach.

Steaks or other pieces of meat 74 to be treated are dropped onto the entrance end of the conveyor within the U-shaped guard 70. The conveyor carries the steak beneath and past the knives 30 which cut spaced and parallel cuts 76 through its top face and short of its bottom face, the fingers 46 serving to compress and hold the meat down on the conveyor and strip it from the knives. When the meat reaches the delivery end of the conveyor it is transferred upside down to the companion conveyor 26' of the machine 18 by the following mechanism.

A rotary drum 78 carried on a shaft 80 is mounted in the frame of the machine transversely of the conveyor adjacent to its delivery end. The drum is driven by a chain 81 from the shaft 27 and is provided with outwardly projecting teeth or pins 82 disposed to engage the bottom face of a steak 74 being delivered from the conveyor. The pins thus receive and lift the steak from the conveyor, as illustrated in Figs. 4 and 2, and deposit it in upside down position on the conveyor 26' of the machine 18. This conveyor thereupon carries the steak beneath its gang of knives 30' which cut spaced parallel cuts 84 partially through its other face relatively angular to the cuts 76 in like manner as above described relative to the machine 16. A drum 79 thereafter receives the treated steak from the conveyor 26' and delivers it to a third conveyor or predetermined location for packaging the meat. The drum 79 is similar to the drum 78 already described except for certain details hereinafter described. It will be apparent that the machine is adapted to receive and convey steaks therethrough and automatically tenderize the same at both faces in the manner illustrated in Fig. 7 of the drawing.

The outer ends of the pins 82 on the drum 78 are pointed to penetrate the meat and carry it a substantial distance around the drum, and stripper fingers 85 anchored to the frame at 87 are provided for preventing the meat from adhering to the pins beyond the predetermined position at which the meat will be delivered upside down. The pins 83 on the drum 79 are blunt so that they engage and transfer the meat without penetrating it. In this case the meat is transferred in upright position, stripper fingers 89 being provided for causing disengagement of the meat from the fingers before it has followed the drum to inverted position. While I have illustrated the steak 74 as being cut at two faces it will be understood that by substituting the drum 79 for the drum 78 the steak will be deposited in upright position on the lower conveyor 26 and the two cuts will be made in the same face of the steak but in relatively right-angular directions.

In Figs. 8 and 9 I have illustrated a modified construction which may or may not employ the cutting knives 30. This construction embodies an endless conveyor 86, like the conveyor 26, and a rotary member or the like 88 having outwardly extending fingers or teeth 90 for receiving the meat as it is being delivered from the conveyor. The member 88 is mounted on a shaft 91 carried in brackets 92 secured by bolts 93 to the frame 94 of the machine, the member being driven by a chain 95 from the conveyor shaft 89.

The outwardly extending teeth 90 of the member 88 are relatively broad and spaced apart around and along the member. Cooperating with the member 88 is a second member 96 on a parallel shaft 97 and having like teeth 98 arranged alternately with the teeth 90. The arrangement is such that a piece of meat 100 passing from the conveyor is engaged by the teeth 90 and conducted along a path between the two members whose teeth engage and crush the meat as it passes therebetween, thus breaking the sinews and tenderizing the meat. The shaft 97 is mounted for free rotation in the brackets 92 and is rotated by contact therewith of the meat and the teeth 90 of the member 88. The meat is delivered from the members 88 and 96 to a conveyor 99 which conducts it to a predetermined location for packing. Stripper fingers 102 are provided on the member 88 for stripping the meat from its teeth 90.

In Figs. 10 and 11 I have illustrated a modified construction similar to that illustrated in Fig. 2 but furthermore employing a chute 110 for receiving the meat from the drum 79 and transferring it upside-down to the second conveyor 26'. This chute is supported at its ends on brackets 111 carried by the frame 66 and embodies a plurality of spaced fingers 112 supported at their upper ends on a bar 114 and extending downwardly and rearwardly to direct the steaks in upside-down position to the lower conveyor.

The form of invention illustrated in Figs. 12 and 13 is similar to that shown in Figs. 10 and 11 except that a stripper 116 is arranged to cooperate with the upper conveyor to strip the steaks therefrom as they approach the delivery end of the conveyor. A chute embodying spaced fingers 118 is arranged to receive the steaks and transfer them upside-down to the lower conveyor. It is pointed out that the steaks are usually treated in partially frozen condition whereby they retain their shape and slide freely down the chute to the lower conveyor. The chutes 110 and 118 are particularly useful when operating on partially frozen steaks which fall more readily from the stripping member 79 or 116, the chute serving to receive the steak and carry it down to the conveyor 26' in reversed position as illustrated in Figs. 10 and 12.

Having thus disclosed my invention what I claim as new and desire to secure by Letters Patent is:

1. A machine for tenderize-cutting a steak partially therethrough along spaced, parallel and relatively angular lines, comprising an endless conveyor supported on rotary rolls at its end loops, a gang of rotary and relatively spaced knives extending across the top reach of the conveyor, a second endless conveyor disposed below, adjacent to the delivery end and transversely of the first conveyor, a gang of rotary and relatively spaced knives extending transversely across the top reach of the second conveyor, a rotary cylindrical steak transferring member disposed above the second conveyor adjacent to and beyond the delivery end and transversely of the first conveyor and parallel to its adjacent supporting roll, said member carrying a plurality of teeth therearound and therealong and extending outwardly thereof for engaging on the free ends of the teeth a steak being delivered by the first conveyor and transferring it in upside down position to the second conveyor, and means for driving the conveyors and cylindrical member continuously in one direction.

2. A machine for tenderize-cutting a steak partially therethrough along spaced, parallel and relatively angular lines, comprising an endless conveyor supported on rotary rolls at its end loops, a gang of rotary and relatively spaced knives extending across the top reach of the conveyor, a second endless conveyor disposed below, adjacent to the delivery end and transversely of the first conveyor, a gang of rotary and relatively spaced knives extending transversely across the top reach of the second conveyor, a steak transferring member disposed above the second conveyor adjacent to and beyond the delivery end and transversely of the first conveyor and parallel to its adjacent supporting roll, said member cooperating with the delivery end of the first conveyor to receive and strip a steak therefrom, a steak receiving chute disposed in spaced relation along and beyond said steak transferring member in position to receive a steak therefrom, and means supporting the chute at its top portion in depending position about said member, the chute having a free end portion extending downwardly and rearwardly beneath said member for conducting the steak to the second conveyor in upside down position.

3. A machine for tenderizing meat, comprising a frame, an endless conveyor supported at its end loops on rotary rolls carried by the frame, a shaft extending transversely across the top reach of the conveyor and adapted to carry thereon a gang of relatively spaced knives for severing meat carried by the conveyor along relatively spaced and parallel lines as the meat passes the knives, a rotary cylindrical steak transferring member disposed adjacent to and beyond the delivery end and transversely of the first conveyor and parallel to its adjacent supporting roll, the member carrying a plurality of teeth disposed therearound and therealong and extending outwardly thereof for engaging on the free ends of the teeth a steak being delivered by the first conveyor and transferring it to a location therebeyond, and means on the frame for driving the conveyor and the cylindrical member in steak delivering and receiving directions respectively.

4. The machine defined in claim 3 in which said teeth comprise relatively broad elements in spaced relation around and along the cylindrical member, a second rotary cylindrical member parallel and cooperating with the first member, the second member having like teeth spaced therealong and therearound and extending between the first named teeth in alternate arrangement therewith in a plane passing through the rotary axes of both members, the two members being adapted to receive a steak from the delivery end of the conveyor and the teeth being adapted to crush the steak as it passes between the members.

WILLIAM F. SPANG.

REFERENCES CITED

The following references are of record in the file of this patent:

UNITED STATES PATENTS

| Number | Name | Date |
|---|---|---|
| 1,819,432 | Mickle | Aug. 18, 1931 |
| 2,223,466 | Spang | Dec. 3, 1940 |
| 2,279,071 | Spang | Apr. 7, 1942 |
| 2,302,398 | Spang | Nov. 17, 1942 |